United States Patent

[11] 3,550,627

| [72] | Inventor | John C. Alexander |
| | | Dearborn Heights, Mich. |
| [21] | Appl. No. | 711,592 |
| [22] | Filed | Mar. 8, 1968 |
| [45] | Patented | Dec. 29, 1970 |
| [73] | Assignee | Essex International, Inc. |
| | | Fort Wayne, Ind. |
| | | a corporation of Michigan |

[54] ROTARY FLUID VALVE CONSTRUCTION
9 Claims, 9 Drawing Figs.

[52] U.S. Cl. .................................................. 137/625.46,
251/180, 251/297
[51] Int. Cl. .................................................. F16k 11/06
[50] Field of Search .................................................. 137/625.46,
625.31, 625.15; 251/180, 297

[56] References Cited
UNITED STATES PATENTS

| 1,133,853 | 3/1915 | Gold | 137/625.46X |
| 1,911,044 | 5/1933 | Thrasher | 251/297X |
| 2,503,618 | 4/1950 | Holm | 251/297X |
| 3,074,431 | 1/1963 | Schwartz et al. | 137/625.46 |
| 3,385,321 | 5/1968 | Ehrens et al. | 251/297X |

FOREIGN PATENTS

| 337,198 | 2/1936 | Italy | 251/297 |
| 535,991 | 11/1955 | Italy | 137/625.46 |

Primary Examiner—Arnold Rosenthal
Attorney—Learman & McCulloch

ABSTRACT: A rotary valve construction according to the invention has a fixed base provided with a plurality of circumferentially spaced fluid ports and an annular, rubberlike valve having arcuate passages overlying the ports and adapted to establish communication between selected ones of the ports. The valve's member is sandwiched between the base and an actuating member which is coupled to the valve to impart rotation to the latter. A driving member is rotatably mounted on the base, and the base and the driving member have cooperable detents for maintaining the driving member in the selected position of rotary adjustment. An operating lever connects the driving member to the actuating member to effect simultaneous rotation of the driving and actuating members. A compression spring maintains the base, the valve member, the actuating member and the driving member in axially stacked relation and permits the necessary relative axial movement of the base and driving members to enable the engagement and disengagement of the cooperable detents.

PATENTED DEC 29 1970
3,550,627
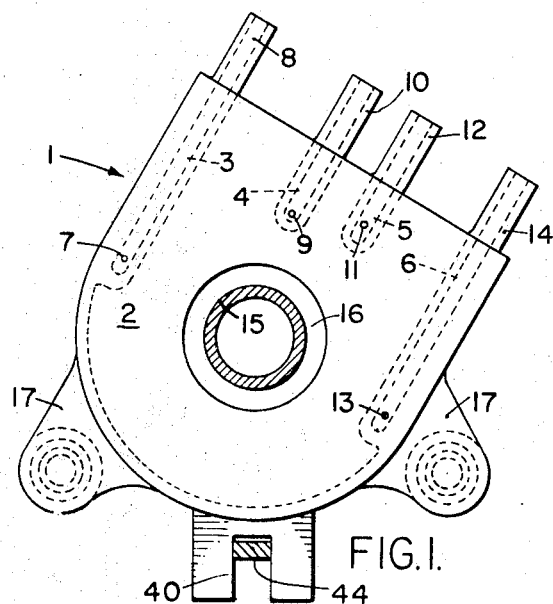
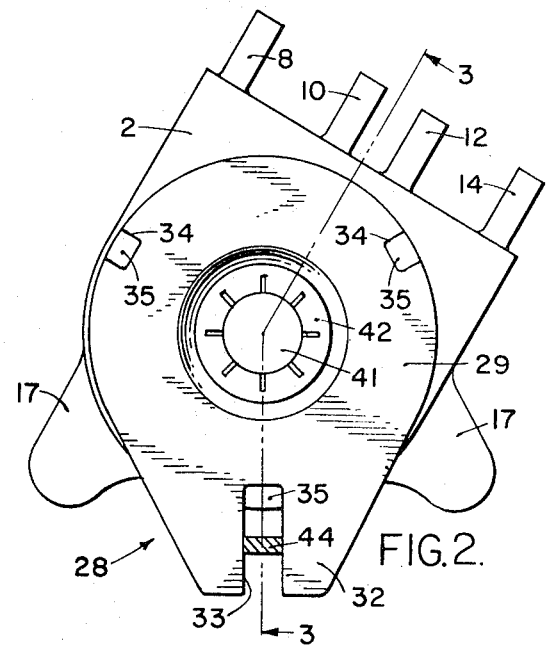
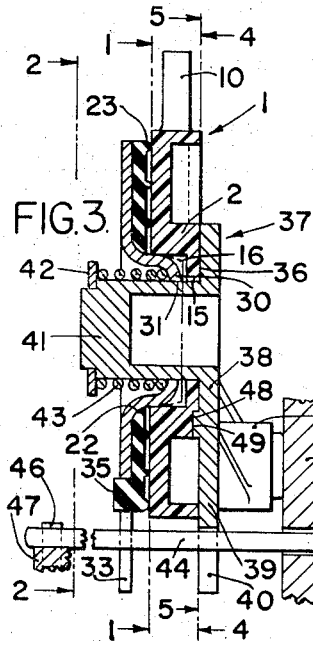
INVENTOR
JOHN C. ALEXANDER
BY
Leaman & McCulloch

ROTARY FLUID VALVE CONSTRUCTION

The invention disclosed herein relates to a fluid valve construction of the type especially adapted for use in automotive vehicles for the operation of vacuum actuated controls for such devices as vents, heaters, defrosters, air conditioners and the like.

Heaters, air conditioners, defrosters, and fresh air vents of the kind currently installed in automotive vehicles conventionally include control devices which are operated from the vehicle's engine vacuum system via a valve which may be manipulated manually by an occupant of the vehicle. The valves currently in use have several disadvantages, such as high manufacturing and assembly costs, the necessity of locating the operating parts within a sealed enclosure, and the inaccessibility of the operating parts for repair and maintenance on the vehicle.

An object of the invention is to provide a valve construction which overcomes the disadvantages referred to above.

Another object of the invention is to provide a valve construction in which the operating parts are self-sealing without the necessity of being enclosed in a sealed housing.

A further object of the invention is to provide a rotary fluid valve construction wherein the parts are easily assembled in stacked relation and are readily accessible for repair or replacement.

Another object of the invention is to provide a rotary valve construction of the character referred to and wherein rotary movement of the valve from one position to another intensifies the seal between the fluid conducting parts.

Other objects and advantages of the invention will be pointed out specifically or will become apparent from the following description when it is considered in conjunction with the appended claims and the accompanying drawings, in which:

FIG. 1 is a sectional view taken on the line 1—1 of FIG. 3, and illustrating one face of a base member forming part of the invention;

FIG. 2 is a view similar to FIG. 1 taken on the line 2—2 of FIG. 3;

FIG. 3 is a transverse sectional view taken on the line 3—3 of FIG. 2;

FIG. 4 is a sectional view taken on the line 4—4 of FIG. 3 and illustrating the opposite face of the base;

FIG. 5 is a sectional view taken on the line 5—5 of FIG. 3;

FIG. 6 is an elevational view of one side of the valve element;

FIG. 7 is a sectional view taken on the line 7—7 of FIG. 6;

FIG. 8 is an enlarged sectional view taken on the line 8—8 of FIG. 4; and

FIG. 9 is an enlarged sectional view taken on the line 9—9 of FIG. 5.

Apparatus constructed in accordance with the invention comprises a base or body member 1 formed of molded, plastic material such as nylon or the like. One surface 2 of the body is planar. Provided in the body 1 is a plurality of fluid passages 3, 4, 5 and 6. The passage 3 terminates at one end in a port 7 which extends through the surface 2 and at the other end in a tubular fitting 8; the passage 4 terminates at one end in a similar port 9 and at the other end in a tubular fitting 10; the passage 5 terminates at one end in a port 11 and at the other end in a similar fitting 12; and the passage 6 has a similar port 13 at one end and a similar fitting 14 at its other end. Each of the fittings 8, 10, 12 and 14 is adapted to be connected by tubes (not shown) to the source of fluid pressure such as the vacuum system of an automotive vehicle engine.

The body 1 has a central opening 15 around which the ports 7, 9, 11 and 13 are circumferentially spaced. The ports 7, 11 and 13 are spaced an equal distance from the center of the opening 15, but the port 9 is located at a shorter radial distance from the center of the opening 15. Surrounding the opening 15 is a dropped center section or annular recess 16. The body 1 is provided with a pair of mounting ears 17 for the accommodation of screws (not shown) by means of which the base 1 may be mounted on a vehicle's dashboard 18 or other suitable support.

Overlying the smooth surface 2 of the body 1 is a rubber or rubberlike valve member 19 having an annular body 20 provided with a central opening 21 of such diameter as to correspond substantially to the diameter of the annular recess 16 of the base. The edge of the body 20 adjacent the opening 21 preferably is arcuate or beveled as is indicated at 22.

The surface of the valve member 19 which confronts the body 1 is provided with three concentric ribs 23, 24 and 25 which, together with a plurality of radial ribs 26 that intersect the ribs 23 and 24, together with the surface of the base 1, form fluid passages adapted to enable and disable communication between selected ones of the ports 7, 9, 11 and 13. The radially outer rib 23 is provided with openings 27 at several points to provide exhaust ports, and the radially inner rib 25 is continuous to provide an inner seal for the passages defined by the ribs 24 and 25.

When the valve 19 is assembled with the base 1, the passage between the ribs 24 and 25 at all times is in communication with the port 9. Depending on the relative angular positions of the valve and the base, one or more of the ports 7, 11 and 13 will communicate with the port 9, or with one another, or with atmosphere through the exhaust ports 27.

Overlying the valve member 19 is an actuating member 28 having a generally circular body 29 provided with a dropped center section 30 having an opening 31 of smaller diameter than that of the annular recess 16 in the base member 1. Except for the dropped center section 30, the actuating member 28 is flat. The member 28 carries an arm 32 extending from the body 29 and in which is a radially extending slot 33.

At circumferentially spaced intervals the actuator body 29 is provided with several notches 34 which, when the members 19 and 28 are assembled in face to face relation, accommodate projections 35 extending from the confronting surface of the valve member 19. Except for the projections 35, the surface of the valve 19 which confronts the actuator is flat. The notches 33, 34 and the projections 35 constitute cooperable coupling means for coupling the members 19 and 28 for conjoint rotation.

The dropped center section 16 of the base member 1 provides a smooth, annular surface 36 on which is seated a driving member 37 having a generally circular body 38 which carries an arm 39 that is provided with a radial slot 40. From one side of the body 38 extends a tubular hub 41 which extends through the opening 15 in the base 1, and through the opening 31 in the actuating member 28. The free end of the hub 41 receives a retaining member 42, and between the latter and the dropped center portion 30 of the actuating member 28 is a compression spring 43. The spring 43 acts axially on the members 1, 19, 28 and 37 so as to maintain them assembled in axially stacked relation with the valve member 19 sandwiched between the actuating member 28 and the base member 1. The valve member 19, therefore, constantly is subjected to axial compression so as to enable the ribs 23—26 to be pressed firmly against the confronting surface 2 of the base 1. The force of the spring also assures retention of the coupling projections 35 in the notches 33 and 34.

Rotation of the driving member 37 may be effected by an operating lever 44 which extends through the slots 33 and 40 of the members 28 and 37, respectively, thereby interconnecting the members 28 and 37, and through a slot 45 in the dashboard 18. The lever 44 may be pivoted as at 46 on any suitable support 47 provided rearwardly of the dashboard 18.

Cooperable detent means is provided to maintain the driving member 37 and the actuating member 28 in any selected position of rotary adjustment relative to the base 1 and comprises a plurality of projections 48 on the body 38 of the driving member 37 which are adapted to be accommodated in selected grooves 49 formed in the confronting surface 36 of the base 1. Each projection 48 is triangular or wedge shaped in cross section, and each groove 49 has a complementary cross section. Thus, the projections 48 may enter and leave the respective grooves 49 in response to rotation of the driving member 37.

An important characteristic of the invention is that the spring 43 exerts a positive, but yieldable, force on the stacked parts of the apparatus so as constantly to urge them toward one another. Due to the resilience of the spring 43, however, the projections 48 may move from one set of grooves 49 to another. As the projections 48 move out of a set of grooves 49, the driving member 37 moves axially away from the base 1 a short distance so as to provide a separation between the members 1 and 37 equal to the axial length of the projections 48. Such separation between the members 1 and 37, however, is accompanied by additional compression of the spring 43, thereby pressing the ribs 23—26 of the valve member 19 more forcibly against the confronting surface of the base 1 and assuring an effective seal between the base and the valve element during rotation of the latter. The axial length of the valve's ribs is greater than the axial length of the projections 48, thereby assuring a continuous seal between the ribs and the surfaces of the base.

When the apparatus is assembled and installed in the manner illustrated, the driving member 37, and consequently the actuating member 28 and the valve member 19, may be rotated so as to enable the arcuate passages defined by the ribs 23—26 to enable or disable communication between selected ports 7, 9, 11 and 13. Depending on the ports which communicate with one another, and upon the construction of the parts to be operated by fluid pressure, the valve construction is such as to permit or prevent the operation of selected parts by pressure fluid.

The assembly of the several parts of the valve construction is extremely simple inasmuch as no external housing is required. Access to any one or more of the parts of the apparatus may be obtained quite simply by the removal of the retainer 42, whereupon the parts may be disassembled.

The disclosed embodiment represents the presently preferred form of the invention, but is intended to be illustrative rather than definitive thereof. The invention is defined in the claims.

I claim:

1. A valve construction comprising a base having a smooth surface provided with spaced-apart ports; an actuating member; means mounting said actuating member on said base for rotation about an axis; a valve member sandwiched between said base and said actuating member and having resilient, deformable ribs projecting therefrom and seated on said surface of said base, said ribs defining passages between said valve member and said base for establishing communication between selected ones of said ports; means for rotating said actuating member; means coupling said actuating member and said valve member for rotating the latter in response to rotation of said actuating member; detent means for releasably maintaining said valve member in a selected position of rotary adjustment relative to said base; and spring means constantly acting on said actuating member and urging the latter toward said base with sufficient force to maintain said ribs in sealing engagement with said surface of said base.

2. The construction set forth in claim 1 wherein said ports are spaced circumferentially of said axis and at different radial distances from said axis.

3. The construction set forth in claim 2 wherein the passages defined by said ribs are arcuate and at different radial distances from said axis, one of said passages being constantly in communication with one of said ports.

4. The construction set forth in claim 1 wherein said coupling means comprises at least one projection on one of said member accommodated in an opening in the other of said members.

5. The construction set forth in claim 1 wherein said coupling means comprises a plurality of circumferentially spaced projections on said valve member accommodated in correspondingly spaced openings in said actuating member.

6. The construction set forth in claim 1 including a driving member rotatable about said axis, said detent means acting between said base and said driving member.

7. The construction set forth in claim 6 wherein said spring means maintains said base, said actuating member, said valve member and said driving member in axially stacked, assembled relation.

8. The construction set forth in claim 7 wherein said spring means constantly urges said driving member toward said base, said spring means permitting relative axial movement of said driving means and said base away from one another during relative rotation thereof, said relative axial movement effecting axial compression of said ribs against said surface of said base.

9. A valve construction comprising a base having a smooth surface provided with spaced-apart ports; an actuating member; a valve member sandwiched between said base and said actuating member and having ribs projecting therefrom seated on said base, said ribs defining passages between said valve member and said base for establishing communication between selected ones of said ports; means mounting said actuating member for rotation about an axis; means for rotating said actuating member, means coupling said actuating member and said valve member for rotating the latter in response to rotation of said actuating member; detent means for releasably maintaining said members in a selected position of rotary adjustment relative to said base; and spring means constantly acting on said actuating member and urging the latter toward said base with sufficient force to maintain said ribs in sealing engagement with said surface of said base.